United States Patent
Brugger

(10) Patent No.: US 10,688,574 B2
(45) Date of Patent: Jun. 23, 2020

(54) METHOD FOR CONTROLLING A DEVICE SYSTEM DURING THE CUTTING OF A WORKPIECE ALONG A CUTTING LINE

(71) Applicant: Hilti Aktiengesellschaft, Schaan (LI)

(72) Inventor: Peter Brugger, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/767,511

(22) PCT Filed: Feb. 11, 2014

(86) PCT No.: PCT/EP2014/052620
§ 371 (c)(1),
(2) Date: Aug. 12, 2015

(87) PCT Pub. No.: WO2014/124931
PCT Pub. Date: Aug. 21, 2014

(65) Prior Publication Data
US 2016/0031022 A1 Feb. 4, 2016

(30) Foreign Application Priority Data
Feb. 14, 2013 (DE) .................. 10 2013 202 445

(51) Int. Cl.
*B23D 59/00* (2006.01)
*B28D 7/00* (2006.01)
*B28D 1/04* (2006.01)

(52) U.S. Cl.
CPC ......... *B23D 59/002* (2013.01); *B23D 59/008* (2013.01); *B28D 1/045* (2013.01); *B28D 7/005* (2013.01)

(58) Field of Classification Search
CPC .... B23D 59/002; B23D 59/008; B28D 1/045; B28D 7/005
USPC ...... 83/13, 74–76, 34, 471.3, 473, 490, 169, 83/520, 663
See application file for complete search history.

(56) References Cited

U.S. PATENT DOCUMENTS

| | | | | |
|---|---|---|---|---|
| 3,323,507 A | * | 6/1967 | Schuman | B23Q 5/385 125/14 |
| 3,722,497 A | * | 3/1973 | Hiestand | B23D 47/02 125/14 |
| 4,370,720 A | * | 1/1983 | Hyatt | B60R 16/0373 700/194 |

(Continued)

FOREIGN PATENT DOCUMENTS

| | | |
|---|---|---|
| DE | 19737617 | 3/1999 |
| DE | 19823756 | 12/1999 |

(Continued)

*Primary Examiner* — Ghassem Alie
*Assistant Examiner* — Bharat C Patel
(74) *Attorney, Agent, or Firm* — Davidson, Davidson & Kappel, LLC

(57) ABSTRACT

A method for controlling a device system (10) during the cutting of a workpiece (18) along a cutting line (43) up to a first end point ($E_1$) using a saw head (12) that can be moved on a guide rail (11) along an advancing direction (26), whereby the saw head (12) is arranged on the guide rail (11) in a starting position ($X_0$), and a first partial length ($L_1$) extending from the starting position ($X_0$) to the first end point ($E_1$) of the cutting line (43) is entered.

8 Claims, 2 Drawing Sheets

(56) References Cited

U.S. PATENT DOCUMENTS

| | | | | |
|---|---|---|---|---|
| 4,779,500 A * | 10/1988 | Bennett | ............... | B26D 7/0006 83/174 |
| 5,058,029 A * | 10/1991 | Uemura | ............... | G05B 19/182 700/169 |
| 5,604,974 A * | 2/1997 | Roberts | ............... | B23Q 15/24 269/24 |
| 5,788,428 A * | 8/1998 | Ward | ............... | B23Q 5/10 318/566 |
| 5,810,448 A * | 9/1998 | Kingsley | ............... | B23D 47/12 125/14 |
| 5,815,400 A * | 9/1998 | Hirai | ............... | G05B 19/401 700/173 |
| 5,921,228 A * | 7/1999 | Watson | ............... | B23D 45/025 125/13.01 |
| 6,131,557 A * | 10/2000 | Watson | ............... | B28D 1/043 125/13.01 |
| 6,553,880 B2 * | 4/2003 | Jacobsen | ............... | A61M 25/0009 451/10 |
| 6,878,954 B2 * | 4/2005 | Butler | ............... | B23D 59/002 250/559.29 |
| 7,191,031 B2 * | 3/2007 | Akama | ............... | B26D 5/20 318/159 |
| 7,337,037 B2 * | 2/2008 | Schaer | ............... | B23D 59/002 125/13.01 |
| 7,395,182 B2 | 7/2008 | Ferrari et al. | | |
| 8,554,355 B2 * | 10/2013 | Wu | ............... | B26D 5/005 438/33 |
| 9,089,994 B2 * | 7/2015 | Flock | ............... | B28D 1/044 |
| 9,327,424 B2 | 5/2016 | Joensson et al. | | |
| 2005/0098004 A1 * | 5/2005 | Dick | ............... | B23D 47/04 83/13 |
| 2006/0149497 A1 * | 7/2006 | Takano | ............... | B23D 45/044 702/151 |
| 2006/0189258 A1 | 8/2006 | Schaer et al. | | |
| 2007/0163412 A1 * | 7/2007 | Baratta | ............... | B23D 47/02 83/651 |
| 2007/0194617 A1 * | 8/2007 | Moller | ............... | B23D 59/001 299/1.5 |
| 2008/0276773 A1 * | 11/2008 | Togare | ............... | B23D 45/024 83/34 |
| 2009/0044680 A1 * | 2/2009 | Elhaus | ............... | B23D 45/105 83/863 |
| 2010/0154605 A1 * | 6/2010 | Kase | ............... | B23B 25/06 82/1.11 |
| 2011/0056084 A1 * | 3/2011 | Okada | ............... | B23D 59/002 30/376 |
| 2011/0056716 A1 * | 3/2011 | Jonsson | ............... | B23D 47/08 173/217 |
| 2011/0303060 A1 * | 12/2011 | Shima | ............... | B23D 59/003 83/13 |
| 2012/0234305 A1 * | 9/2012 | Jonsson | ............... | B23D 47/12 125/13.03 |
| 2015/0151451 A1 | 6/2015 | Flock | | |
| 2015/0375318 A1 * | 12/2015 | Brugger | ............... | G05B 19/19 700/192 |

FOREIGN PATENT DOCUMENTS

| | | | | |
|---|---|---|---|---|
| EP | 1693173 | 8/2006 | | |
| EP | 2181788 | 5/2010 | | |
| EP | 2607003 | 6/2013 | | |
| EP | 2607003 A1 * | 6/2013 | ............ | B28D 1/044 |
| JP | 2006231920 | 9/2006 | | |
| JP | 2009513367 | 4/2009 | | |
| RU | 2247651 | 3/2005 | | |
| RU | 2011107498 | 8/2012 | | |
| RU | 2464166 | 10/2012 | | |
| WO | WO00047378 | 8/2000 | | |

* cited by examiner

METHOD FOR CONTROLLING A DEVICE SYSTEM DURING THE CUTTING OF A WORKPIECE ALONG A CUTTING LINE

The present invention to method for controlling a device system during the cutting of a workpiece along a cutting line.

BACKGROUND

In manual processes for cutting a workpiece along a cutting line, the operator has to approach the end points of the cutting line by manually controlling the motor-driven advancing mechanism during the processing. If the saw blade is surrounded by a blade guard, the exit points of the saw blade in the workpiece are hardly or not at all visible to the operator, so that the operator cannot determine the end points of a cutting line during the work process.

European patent application EP 1 693 173 A1 discloses a method that is at least partially automated for controlling a device system during the cutting of a workpiece along a cutting line. The device system consists of a guide rail, a saw head that is arranged so as to be movable on the guide rail and a motor-driven advancing mechanism to move the saw head along the guide rail. The saw head comprises a saw blade that is attached to a saw arm and that is driven around a rotational axis. The saw arm is configured so that it can be swiveled around a swivel axis. The cutting depth of the saw blade in the workpiece is varied by a swiveling movement of the saw arm around the swivel axis. The saw blade is rotated around the rotational axis by a drive motor, while the saw arm is swiveled by a swivel motor. The drive motor and the swivel motor are arranged in a device housing of the saw head. The motor-driven advancing mechanism comprises a guide carriage and an advancing motor that is arranged in the device housing. The saw head is installed on the guide carriage and configured so as to be movable by the advancing motor along the guide rail in an advancing direction. Aside from the motors, there is also a control unit that is installed in the device housing and that serves to control the wall saw and the motor-driven advancing mechanism.

This prior-art method for controlling the device system during the cutting of a workpiece entails a sequence of three method steps that are carried out one after the other. In the first method step, the saw arm is slanted at a swivel angle that corresponds to the depth of the partial cut. In the second method step, the saw head is moved forward along the guide rail along the advancing direction until it reaches the first end point of the cutting line. In the third method step, the saw head is moved backwards along the guide rail along the advancing direction until it reaches the second end point of the cutting line. These three method steps are continuously repeated until the desired cutting depth has been reached. The at least partially automated cutting method requires the operator to enter the end points of the cutting line but it does not contain any information about how the coordinates of the end points are specified by the operator.

SUMMARY OF THE INVENTION

It is an object of the present invention to provide a method for controlling a device system during the cutting of a workpiece along a cutting line in such a way that it becomes easier for the operator to determine the end points.

The present invention provides that the saw head is arranged on the guide rail in a starting position and a first partial length extending from the starting position to the first end point of the cutting line is entered. The operator can arrange the saw head on the guide rail at any desired starting position between the first and second end points of the cutting line. The coordinates of the first end point are calculated in a control unit of the device system on the basis of the first partial length. In this context, the first partial length comprises not only the value but also the direction in which the first partial length is measured beginning at the starting position.

A suitable starting position for a swiveling saw arm is, for example, the position of the swivel axis of the saw arm since, during the swiveling movement, the position of the swivel axis remains unchanged in the advancing direction. The starting position as well as a positive and a negative direction beginning at the starting position are indicated by a mark on the saw head. The operator measures the distance from the starting position to the first end point and then enters this value, together with the direction in which the first partial length is measured.

In a preferred variant, the total length extending from the first end point to a second end point of the cutting line is entered. The positions of the end points of the cutting line are calculated in the control unit of the device system on the basis of the first partial length and the total length. Entering the total length is advantageous when the work task prescribes the total length of the cut. If the total length is known, only one partial length between the starting position of the saw head and one of the end points needs to be measured. The measuring effort is reduced in comparison to a work task which requires that both lengths be measured.

In an alternative preferred variant, a second partial length extending from the starting position to a second end point of the cutting line is entered. In this context, the second partial length comprises not only the value but also the direction in which the second partial length is measured beginning at the starting position. The positions of the end points of the cutting line are calculated in the control unit of the device system on the basis of the first and second partial lengths (value and direction). Entering the second partial length is advantageous when the work task does not prescribe the total length of the cut and the measuring of the total length involves a greater effort.

In a preferred embodiment, the operator enters the first partial length, the second partial length and/or the total length of the cutting line by means of a control unit. Entering the lengths manually has the advantage that any measuring device can be used by the operator in order to measure the distance.

In an alternative preferred embodiment, the first partial length, the second partial length and/or the total length of the cutting line are entered by means of a sensor system. The use of a sensor system has the advantage that the measured lengths can be transmitted directly by the sensor system to the control unit of the device system, as a result of which the risk of erroneous transmission is reduced.

Especially preferably, the first partial length, the second partial length and/or the total length of the cutting line are transmitted by the sensor system to the device system via a communication connection. The operator measures one or more of the lengths by means of the sensor system and establishes a communication connection between the sensor system and the control unit of the device system. Since the lengths are transmitted via a communication connection, the sensor system can be employed with several device systems.

Embodiments of the invention will be described below with reference to the drawing. The drawing does not necessarily depict the embodiments true-to-scale, but rather, the drawing—where necessary for the sake of explanation—is shown in schematic and/or slightly distorted form. Regarding any additions to the teaching that can be gleaned directly from the drawing, reference is hereby made to the pertinent state of the art. Here, it should be kept in mind that many modifications and changes relating to the shape and to details of an embodiment can be made without departing from the general idea of the invention. The features of the invention disclosed in the description, in the drawing as well as in the claims can be essential for the refinement of the invention, either individually or in any desired combination. Moreover, all combinations of at least two of the features disclosed in the description, in the drawing and/or in the claims fall within the scope of the invention. The general idea of the invention is not limited to the exact form or detail of the preferred embodiment shown and described below nor is it limited to a subject matter that would be limited in comparison to the subject matter put forward in the claims. At given rated ranges, values that fall within the specified limits are also disclosed as limit values and can be used and claimed as desired. For the sake of clarity, identical or similar parts or else parts with an identical or similar function are designated by the same reference numerals below.

BRIEF DESCRIPTION OF THE DRAWINGS

The following is shown.

DETAILED DESCRIPTION

Figure 1:
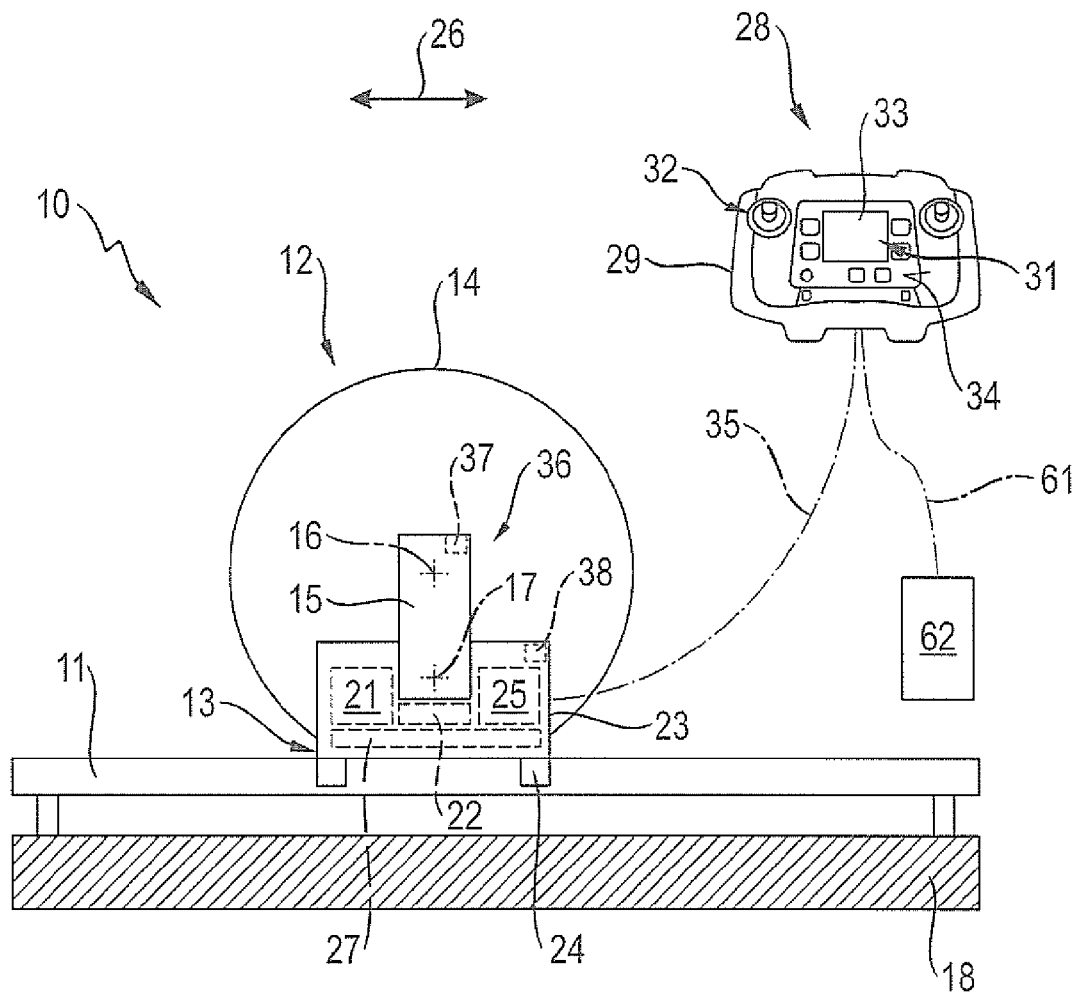
FIG. 1: a rail-guided device system consisting of a guide rail, a saw head that is arranged so as to be movable on the guide rail and a motor-driven advancing mechanism to move the saw head along the guide rail.

FIG. 1 is a schematic view of a rail-guided device system 10, consisting of a guide rail 11, a power tool 12 that is arranged so as to be movable on the guide rail 11, and a motor-driven advancing mechanism 13 to move the power tool 12 along the guide rail 11.

The power tool is configured as a saw head 12 and it comprises a saw blade 14 that is attached to a saw arm 15 and that is driven around a rotational axis 16. The saw arm 15 is configured so that it can be swiveled around the swivel axis 17. The cutting depth of the saw blade 14 is varied by a swiveling movement of the saw arm 15 around the swivel axis 17. The swivel angle of the saw arm 15, together with the diameter of the saw blade 14, determines how deep the saw blade 14 plunges into the workpiece 18 that is to be processed. As an alternative to the swiveling movement of the saw arm 15 around the swivel axis 17, the saw arm 15 can be adjusted, for instance, by means of a linear drive or another such drive unit. In order to protect the operator, the saw blade 14 can be surrounded by a blade guard that is attached to the saw arm 15 by means of a blade guard holder.

The saw blade 14 is rotated around the rotational axis 16 by a drive motor 21, while the saw arm 15 is swiveled around the swivel axis 17 by a swivel motor 22. The drive motor 21 and the swivel motor 22 are arranged in a device housing 23 of the saw head 12. The motor-driven advancing mechanism 13 comprises a guide carriage 24 and an advancing motor 25 that is arranged in the device housing 23. The saw head 12 is installed on the guide carriage 24 and configured so as to be movable by the advancing motor 25 along the guide rail 11 in an advancing direction 26. The device housing 23 accommodates not only the motors 21, 22, 25, but also a first control unit 27 to control the saw head 12 and the motor-driven advancing mechanism 13.

The device system 10 is operated by means of a control unit 28 which, in the embodiment shown in FIG. 1, is configured as a remote control unit. The remote control unit 28 comprises a device housing 29, a second control unit 31 accommodated in the device housing 29 as well as an operating means 32 and a display means 33 that are arranged on the top 34 of the device housing 29. The second control unit 31 is connected to the first control unit 27 via a communication connection 35. The communication connection 35 is configured as a hard-wired connection or else as a wireless communication connection, for example, in the form of an infrared, Bluetooth, WLAN or Wi-Fi connection. Aside from the listed wireless connection technologies, all familiar and future wireless connection technologies for data transmission are suitable.

The device system 10 has a sensor system 36 with several sensor elements in order to monitor the device system 10 and the work process. A first sensor element 37 is configured as a swivel-angle sensor, while a second sensor element 38 is configured as a position sensor. The swivel-angle sensor 37 measures the momentary swivel angle of the saw arm 15. The swivel angle of the saw arm 15, together with the diameter of the saw blade 14, determines how deep the saw blade 14 plunges into the workpiece 18. The position sensor 38 measures the momentary position of the saw head 12 on the guide rail 11. The measured quantities are transmitted to the first control unit 27 by the swivel-angle sensor 37 and by the position sensor 38.

Figure 2:
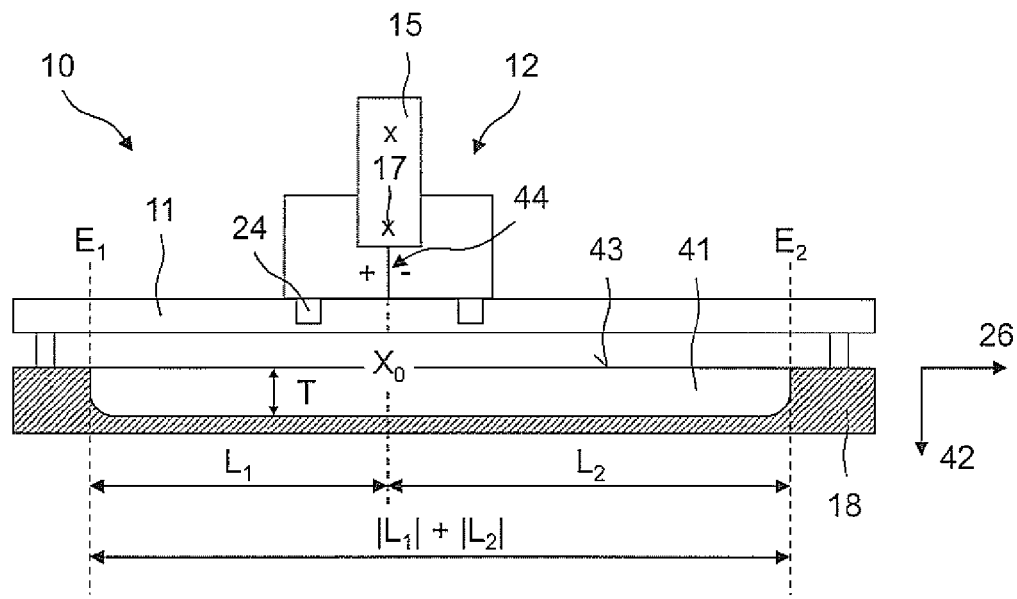
FIG. 2: the device system shown in FIG. 1, during the creation of a cut between a first and a second end point, without overcuts.

FIG. 2 shows the device system 10 of FIG. 1 in a first variant. A cut 41 is made in the workpiece 18 using the device system 10. The cut 41 has a depth T in a depth direction 42 and it runs in the advancing direction 26 along a cutting line 43 between a first end point $E_1$ and a second end point $E_2$. The cut 41 is made in several partial cuts until the desired cut depth T is reached. In the case of the cut 41 shown in FIG. 2, no overcut is possible at the end points $E_1$, $E_2$, so that the cutting depth 41 at the end points $E_1$, $E_2$ is smaller than the cutting depth T.

By means of the guide carriage 24, the saw head 12 is positioned on the guide rail 11 in a starting position $X_0$. The starting position $X_0$ of the saw head 12 is between the first and second end points $E_1$, $E_2$ of the cutting line 43 and it is determined by the position of the swivel axis 17 of the saw arm 15. The position of the swivel axis 17 in the advancing direction 26 during the swiveling movement of the saw arm 15 around the swivel axis 17 remains unchanged. The starting position $X_0$ as well as a positive and a negative direction beginning at the starting position $X_{10}$ are indicated by the mark 44.

The positions of the first and second end points $E_1$, $E_2$ in the advancing direction 26 are prescribed by entering the partial lengths. The distance between the starting position $X_0$ and the first end point $E_1$ determines a first partial length $L_1$, while the distance between the starting position $X_0$ and the second end point $E_2$ determines a second partial length $L_2$. Based on the mark 44, the first partial length $L_1$ is measured in the positive direction, while the second partial length $L_2$ is measured in the negative direction. The operator measures the first and second partial lengths $L_1$, $L_2$ and then, using the operating means 32, he/she enters the measured partial lengths $L_1$, $L_2$ together with the directions of the partial lengths into the remote control unit 28. The operator enters not only the partial lengths $L_1$, $L_2$ but also the desired depth T of the cut 41 as well as the device parameters such as, for instance, the diameter of the saw blade 14 and the workpiece that is to be processed into the remote control unit 28. Moreover, the operator indicates whether there should be an overcut at one of the end points $E_1$, $E_2$, at both end points $E_1$, $E_2$ or at neither of the end points $E_1$, $E_2$. The control commands for making the cut 41 are generated in the first or second control unit 27, 31 on the basis of the partial lengths $L_1$, $L_2$, on the basis of the device parameters and on the basis of additional information. The cut 41 is made in several consecutive partial cuts in the workpiece 18 until the desired cut depth T is reached.

Figure 3:
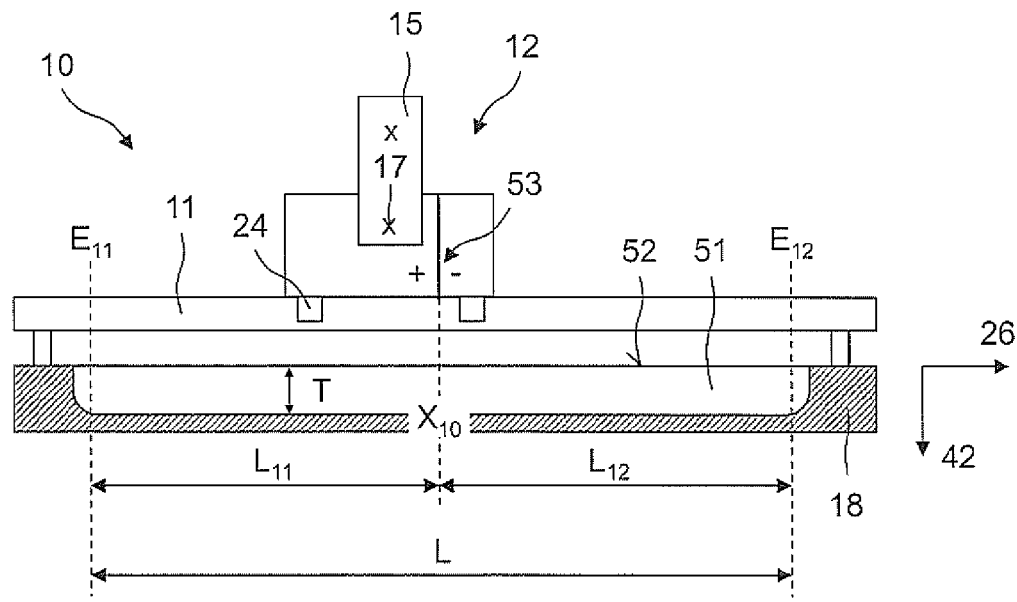
FIG. 3: the device system of FIG. 1, during the creation of a cut between a first and a second end point, with overcuts.

FIG. 3 shows the device system 10 of FIG. 1 in a second variant. A cut 51 is made in the workpiece 18 using the device system 10. The cut 51 has a depth T in a depth direction 42 and it runs in the advancing direction 26 along a cutting line 52 between a first end point $E_{11}$ and a second end point $E_{12}$. The end points $E_{11}$, $E_{12}$ of FIG. 3 differ from the end points $E_1$, $E_2$ of FIG. 2 in that overcuts are allowed and the cut 51 reaches the depth T at the end points $E_{11}$, $E_{12}$.

The saw head 12 is positioned by means of the guide carriage 24 on the guide rail 11 in a starting position $X_{10}$. The mark 53 indicates the starting position $X_{10}$ of the saw head 12 is between the first and second end points $E_{11}$, $E_{12}$ and it is determined by a mark 53 on the device housing 23 of the saw head 12. The starting position $X_{10}$ as well as a positive and a negative direction beginning at the starting position $X_{10}$.

The positions of the end points $E_{11}$, $E_{12}$ in the advancing direction 26 are specified by entering a partial length (value and direction) as well as a total length. The distance between the starting position $X_0$ and the first end point $E_{11}$ determines a first partial length $L_{11}$, while the distance between the first and second end points $E_{11}$, $E_{12}$ determines the total length L. The positions of the end points $E_{11}$, $E_{12}$ are calculated on the basis of the first partial length $L_{11}$, on the basis of the direction in which the first partial length $L_1$ is measured, and on the basis of the total length L. Instead of the total length L, the operator can enter a second partial length $L_{12}$ (value and direction) between the starting position $X_{10}$ and the second end point $E_{12}$. The total length L of the cut 51 results from the sum of the values for the first and second partial lengths $|L_{11}|+|L_{12}|$. Entering the total length L lends itself whenever the total length L of the cut 51 is prescribed, for instance, in case of a wall opening for a door having a height of 2.30 m. If the total length L is known, only one partial length between the starting position $X_{10}$ of the saw head 12 and one of the end points $E_{11}$, $E_{12}$ needs to be measured.

The operator can manually enter the partial lengths $L_{11}$, $L_{12}$ or the total length L of the cut 51 by using the operating means 32. As an alternative, the device system 10 can be connected to a sensor system 62 for the distance measurement via a communication connection 61 (see FIG. 1). The operator measures one of the lengths using the sensor system 62 and the measured length is then transmitted to the first or second control unit 27, 31 of the device system 10 via the communication connection 61. In the case of the embodiment of FIG. 1, the sensor system 62 is connected to the second control unit 31 via the communication connection 61.

In order to carry out the laser distance measurement, a reflecting and/or scattering surface for the laser beam has to be present at the end point whose length is to be measured. The laser distance measurement can be assisted by an active or passive target object. In another variant, the sensor system 62 for the distance measurement can be integrated into the device system 10.

What is claimed is:

1. A method for controlling a device system during the cutting of a workpiece along a cutting line between a first end point and a second end point using a saw head movable on a guide rail in a positive advancing direction and a negative advancing direction, the cutting line including a total length extending from the first end point to the second end point, the method comprising:
   arranging the saw head on the guide rail in a starting position between the first end point and the second end point, the starting position separating the total length in a first partial length extending from the starting position to the first end point and in a second partial length extending from the starting position to the second end point;
   before moving the saw head on the guide rail, entering in a remote control of the device system, a value of a distance of the first partial length and a direction of the first partial length, the direction of the first partial length being the positive advancing direction or the negative advancing direction;
   before moving the saw head on the guide rail, calculating by a first control unit of the saw head or a second control unit of the remote control, based on the starting position, on the value of the distance of the first partial length and on the direction of the first partial length, the position of the first end point; and
   moving, by an advancing motor, the saw head on the guide rail alternately in the positive advancing direction and the negative advancing direction between the calculated position of the first end point and the second end point.

2. The method as recited in claim 1 further comprising:
   before moving the saw head on the guide rail, entering in the remote control of the device system, a value of the total length extending from the first end point to the second end point of the cutting line; and
   before moving the saw head on the guide rail, calculating by the first control unit of the saw head or the second control unit of the remote control, based on the starting position, on the first partial length and on the total length, the position of the second end point.

3. The method as recited in claim 2 wherein the value of the distance of the first partial length, the direction of the first partial length and the value of the total length of the cutting line are entered by the operator via operating means into the remote control of the device system.

4. The method as recited in claim 1 further comprising:
   before moving the saw head on the guide rail, entering in the remote control of the device system, a value of a distance of the second partial length and a direction of the second partial length, the direction of the second partial length being the positive advancing direction or the negative advancing direction: and
   before moving the saw head on the guide rail, calculating, by the first control unit of the saw head or the second control unit of the remote control, based on the starting position, on the value of the distance of the second partial length and on the direction of the second partial length, the position of the second end point.

5. The method as recited in claim 4 wherein the value of the distance of the first partial length, the direction of the first partial length, the value of the distance of the second partial length and the direction of the second partial length are entered by the operator via operating means into the remote control of the device system.

6. The method as recited in claim 1 wherein the value of the distance of the first partial length and the direction of the first partial length, a value of a distance of the second partial length and a direction of the second partial length or a value of the total length of the cutting line are entered by the operator via operating means into the remote control of the device system.

7. The method as recited in claim 1 wherein the value of the distance of the first partial length and the direction of the first partial length, a value of a distance of the second partial length and a direction of the second partial length or a value of the total length of the cutting line are entered via a sensor system for a distance measurement into the remote control of the device system.

8. The method as recited in claim 7 wherein the value of the distance of the first partial length and the direction of the first partial length, the value of the distance of the second partial length and the direction of the second partial length or the value of the total length of the cutting line are transmitted by the sensor system to the remote control of the device system via a communication connection.

* * * * *